(12) United States Patent
Andersson (10) Patent No.: US 10,539,333 B2
(45) Date of Patent: Jan. 21, 2020

(54) APPARATUS AND METHOD FOR HEATING AIR AT AN AIR TREATMENT DEVICE

(71) Applicant: FLÄKT WOODS AB, Jönköping (SE)

(72) Inventor: Johan Andersson, Huskvarna (SE)

(73) Assignee: FLÄKTGROUP SWEDEN AB, Jönköping (SE)

( * ) Notice: Subject to any disclaimer, the term of this patent is extended or adjusted under 35 U.S.C. 154(b) by 272 days.

(21) Appl. No.: 15/032,075

(22) PCT Filed: Nov. 12, 2014

(86) PCT No.: PCT/SE2014/051341
§ 371 (c)(1),
(2) Date: Apr. 26, 2016

(87) PCT Pub. No.: WO2015/080650
PCT Pub. Date: Jun. 4, 2015

(65) Prior Publication Data
US 2017/0003036 A1    Jan. 5, 2017

(30) Foreign Application Priority Data
Nov. 26, 2013   (SE) ...................... 1351400

(51) Int. Cl.
*F24D 12/02*    (2006.01)
*F24D 5/12*    (2006.01)
(Continued)

(52) U.S. Cl.
CPC .............. *F24D 12/02* (2013.01); *F24D 5/12* (2013.01); *F24D 19/1087* (2013.01); *F24F 12/001* (2013.01)

(58) Field of Classification Search
CPC .................................................... F24F 12/003
(Continued)

(56) References Cited

U.S. PATENT DOCUMENTS 2,468,626 A * 4/1949 Graham ................. F24F 3/001
165/240
3,721,800 A * 3/1973 Eisler ..................... F24D 13/02
219/213
(Continued)

FOREIGN PATENT DOCUMENTS

EP    2 397 787 A2    12/2011
GB    2 481 583 A    1/2012
(Continued)

OTHER PUBLICATIONS

International Search Report Corresponding to PCT/SE2014/051341 dated Mar. 20, 2015.
(Continued)

*Primary Examiner* — Steven B McAllister
*Assistant Examiner* — John E Bargero
(74) *Attorney, Agent, or Firm* — Davis & Bujold PLLC; Michael J. Bujold (57) ABSTRACT

An air treatment device (1) and a method for heating of aft, in a heating mode, at an air handling unit (2), which comprises a heat recovery device (3). The device further comprises a heat pump (6), comprising an evaporator (7), arranged in a first air stream (4), in the flow direction, after the heat recovery device (3), and a condenser (8) arranged in a second air stream (5), in the flow direction, after the heat recovery device (3). The device further comprises an auxiliary heater (9) for supplying, in addition to the recovered energy, external heat energy. The auxiliary heater (9) is positioned in the first air stream (4), in the flow direction, after the heat recovery device (3) and before the evaporator (7) for heating and thereby the heat pump (6) operation is maintained and a better total efficiency for the plant is achieved.

10 Claims, 4 Drawing Sheets

(51) Int. Cl.
  *F24D 19/10* (2006.01)
  *F24F 12/00* (2006.01)
(58) Field of Classification Search
  USPC .............................. 62/160, 333, 94; 237/2 B
  See application file for complete search history.

(56) References Cited

U.S. PATENT DOCUMENTS

| | | | |
|---|---|---|---|
| 4,585,524 A * | 4/1986 | Hoiss | B01D 3/007 203/11 |
| 2006/0201183 A1 | 9/2006 | Otake et al. | |
| 2008/0230530 A1* | 9/2008 | Augustine | H05B 3/342 219/212 |
| 2010/0024452 A1* | 2/2010 | Lifson | F25D 21/006 62/154 |
| 2011/0308265 A1* | 12/2011 | Phannavong | F24F 12/001 62/160 |
| 2012/0180505 A1 | 7/2012 | Gerber et al. | |
| 2013/0056177 A1 | 3/2013 | Coutu et al. | |
| 2015/0292786 A1 | 10/2015 | Andersson | |
| 2015/0377507 A1* | 12/2015 | Thomple | F24F 12/006 700/276 |

FOREIGN PATENT DOCUMENTS

| | | |
|---|---|---|
| JP | 2002-081688 A | 3/2002 |
| SE | 1200784 A1 | 7/2014 |

OTHER PUBLICATIONS

Written Opinion Corresponding to PCT/SE2014/051341 dated Mar. 20, 2015.
International Preliminary Report on Patentability Corresponding to PCT/SE2014/051341 dated Feb. 29, 2016.

* cited by examiner

APPARATUS AND METHOD FOR HEATING AIR AT AN AIR TREATMENT DEVICE

TECHNICAL FIELD

The present invention relates to an apparatus and method for supplying external heat energy to an air stream in an air treatment device, firstly to be able to heat the supply air to for example a premises, to the desired temperature, regardless of the outdoor temperature. The air treatment apparatus comprises an air handling unit with a heat recovery device, as well as a heat pump, both to take advantage of the energy from the exhaust air from the premises and transfer it to the supply air, if heating of the supply air is necessary. In addition to the recovery of energy through the heat recovery device and extraction of energy from the exhaust air by the heat pump, an addition of external energy might be needed to meet all operating conditions in a plant, why an additional heater is also available in the facility.

BACKGROUND OF THE INVENTION

It is well known within air treatment technology to, in various ways, provide an air treatment device with some kind of heat recovery equipment to reduce heating costs for heating of cold outdoor air to warm supply air in a plant. Common variants are air based solutions, for example, the rotary heat exchanger and the cross flow heat exchanger. Furthermore, there are also liquid-coupled solutions with some form of liquid that circulates between the hot and the cold side for absorbing heat from the exhaust air and releasing heat to the supply air.

To further take advantage of the energy in the exhaust air, heat pump solutions (Heat Pumps) are used, wherein a so-called direct expansion coil—a DX-coil—is positioned in the supply air, in the air flow direction after heat recovery, and one DX-coil is positioned in the extract air, that is in the air after the heat exchanger, thus the air to be released into the free. In heating mode, the DX-coil positioned in the exhaust air constitutes a evaporator, while the DX-coil in the supply air constitutes a condenser. DX-coils usually consist of a number of copper tubes with aluminum fins, where the refrigerant passes through the copper tube and heat is emitted or absorbed through exchange with the ambient air passing through the DX-coil. The aluminum fins increases the heat transfer surface of the DX-coil. The heat pump process is not described in detail here. By the heat pump, more heat energy can be recovered from the exhaust air/extract air and by the heat pump process be transferred with higher energy content to the supply air. Also solutions that only use the heat pump as "recyclers" occur of course too.

Although heat recovery today usually is very effective—a rotating heat exchanger for example reaches a temperature efficiency of about 85%—there are in many cases a need of adding external heat energy to cope with the heating of the supply air during all times of the year, particularly in winter, and parts of fall and spring, of course depending on where the air handling plant is located geographically. Most common in Nordic countries, is to position a heating coil or a liquid-coupled heating coil, for example connected to a district heating system, in the supply air after the heat recovery device, to increase the supply air temperature to the desired level, in cases where the heat exchanger and/or heat pump is not capable of the full warming. In Europe, it is common to provide air treatment devices with a so called "frost-coil", which is a heating coil for supply of external energy in order to defrost the heat exchanger. For that purpose, the heating coil is placed in the air flow direction before the heat exchanger, on the supply side, i.e. the external heat energy is supplied to the incoming outdoor/supply air in this position.

A known problem with heat pumps is that the operation becomes inefficient and in some cases with high wear on the heat pump components as a result, when the temperature of the air passing the evaporator gets too low, For Nordic climate it is common to recommend that the heat pump switches off at a temperature around −15° C. When the heat pump cannot be utilized, the entire heat pump contribution to the heat of the supply air has to be replaced by additional heating, an external heater is normally placed, as described above, in the supply air after the heat recovery equipment. At a heat pump the relationship between input driving energy and the recovered heat energy is described as the COP value, and typically, this value is between COP 2-5, meaning that the extracted energy is 2-5 times as great as the electrical energy input to the heat pump. If the corresponding energy should be added to the supply air by means of an electric heating coil, the cost is directly proportional to the power consumption. If instead a liquid-coupled heating coil is used, the corresponding energy must be produced in one way or another and be supplied to the heating coil. There are advantages to install an electric heating coil because it is a simple and relatively inexpensive installation, while a liquid-coupled solution is significantly more expensive than the electric heating coil installation. In return, the liquid-coupled solution would be preferable if the right conditions exist for production and connection to the heat source. Further disadvantages of existing solutions are that when the whole addition of heat should take place in the supply air, at the coldest temperatures, the physical dimensions of the auxiliary heater becomes great because it is a high power to manage. Furthermore, if the electric heating coil is used, even the main fuse for the plant can be affected when the plant has to cope with a substantial electrical power, which in itself increases the cost of both installation and that operating costs increase with higher fees for higher main fuse, all these drawbacks despite these operating conditions occur only during a few occasions or for a shorter period of total operating time of the plant.

DISCLOSURE OF THE INVENTION

With the present invention the object is achieved to solve the above problems from a first aspect of the invention, by an air treatment device according to the preamble of claim 1, comprising an auxiliary heater disposed in the extract air in the air flow direction after the heat recovery device and before the evaporator. Through this positioning, and by adding external heat energy to the air just before the evaporator, the operating time of the heat pump extends and the regulation of the auxiliary heater is optimally adapted for supplying minimal additional heat to maintain heat pump operation, with maintained positive performance of the heat pump. Incoming air to the evaporator is kept at the right temperature and the system is balanced and operated to obtain the lowest possible operating cost, The total efficiency of the plant will be better, especially in cold climates as Nordic, Further the overall efficiency is improved by that it is also possible to let the heat recovery (for example, a rotary heat exchanger) continue working to the maximum. In older solutions one are forced to turn off the heat pump at low outdoor temperatures and allow the external addition of energy to provide the complete needs in addition to the heat that the heat exchanger transfers to the supply air, Alternatively, for example, the heat recovery must be reduced to increase the temperature before the evaporator and thus let the heat pump operation continue, but this is a poor solution because running a heat exchanger, such as a rotor, costs "almost nothing" in relation to the high recovery rate as it actually gives, This is not economically justifiable to compensate with extended operation of the heat pump.

According to a preferred embodiment of the air treatment device the auxiliary heater is integrated with the evaporator to become one unit, The system can then be delivered and installed as a unit which simplifies the total installation in connection to or in the air handling unit. It is important that the auxiliary heater is situated on the side of the evaporator facing the heat exchanger—the upstream side of the evaporator—to fulfill the invention. Development within air treatment technology is moving more and more towards so-called "plug and play" solutions where a client or a contractor purchases a pre-packaged solution. This makes the distinction between who is responsible for the function clearer and the provider clearly is responsible for the function. It is beneficial both for the contractor, who only need to connect, for example, power supply, ducts and any pipe connection and so on, and in addition he can be sure that the auxiliary heater is well suited to the evaporator and that these work well together as a uniform solution. By the integration of the auxiliary heater with the evaporator, the unit further becomes more compact, i.e. takes less space within or in connection to the air handling unit. Older solutions totally lacks auxiliary heater within or in connection to the evaporator and only presents auxiliary heaters on the supply sir side, or alternatively the solution with frost coil previously described in the background description.

To keep a low cost and a simple design solution with the simplest possible connection method, an electric heater is used, according to a preferred embodiment. Electric heaters are present in a number of different variants, and depending on requirements of a client for a specific type of electric heater, the invention is not limited to only offer one type of auxiliary heater. Although different types of electric heaters may be considered, it is for the installer yet easy to calculate the cost of the installation etc. by that the connection of the auxiliary heater is done with electricity. An electric heater gives a principally lossless supply of heat to the air before the evaporator.

According to another preferred embodiment of the device the auxiliary heater is a so called electric heating coil, or in daily speech electrical heater. The electric heating coil is a simple construction, and consists in the simplest form of a heating circuit with electrical coupling and possible controls. Because it is a simple and cheap design it is suitable to provide auxiliary heat in connection to the heat pump, which gives the above described advantages through a simple and cheap installation. An electric heating coil is easy to integrate with the air handling unit or as a module in connection to the unit or to the heat pump, depending on what kind of construction design sought. Older solutions presents as said auxiliary heaters in form of electric heating coil, but with the difference that the heater is positioned in the supply air. Admittedly, the efficiency of the heater itself is equally well regardless of where in the system it is positioned, but the overall efficiency is the key. Through the placement according to the invention the heat pump is fully utilized, which overall gives a better operation economy than older solutions. Ideally, the heat pump virtually handles the entire operation, while the electric heating coil only is needed for short periods, and therefore it is important that the auxiliary heater is a simple and inexpensive variant as an electric heating coil. Additional advantages over that as in older solutions to heat with electric heating coil in the supply air, are that the electric heating coil does not need such high power at the new location, which effects the size of the main fuse and also space requirements, as mentioned above.

According to a further preferred embodiment, the electric heater consists of one or more so-called electric heating rods. A particularly advantageous use is in combination with the evaporator, if this comprises a number of voids in the lamellar structure. A typical heating or cooling coil or evaporator usually consists of a copper loop for the heat-absorbing/emitting medium, in a number of tube rows, and one plate pack of for example aluminum fins. These fins are flanged to the copper tubes with good engagement with the tube surface. However, it is common that the fins are punched with holes for all possible positions of the copper tubes, but it is not certain that all positions are "filled" with copper tubing. The coil is designed for the best performance, but taking into account that copper is expensive, it is not efficient to fill all positions with copper tubing throughout the cross section of the coil. It is therefore easy to integrate these electric heating rods with, in this case the evaporator, by sliding them into the empty positions in the plate pack. Thereby the auxiliary heater occupies, no extra space that affects the evaporator outer dimensions, and the auxiliary heater is easily integrated in the evaporator, if desired. The embodiment is not limited to that the electric heating rods must be integrated in the evaporator, but can equally well be positioned elsewhere in the plant.

A preferred embodiment of the invention is that the electric heater consists of one or more so-called electric heating films. Electric heating film is a common type of heater used to heat areas such as for example at car mirrors. Even within ventilation occurs in some markets electric heating film as a supplemental heat source, for example in heating/cooling beams, where a plate surface is heated by the electric heating film and supply air to a room passing the warm plate surface. In this way, the air is heated by convection with the plate surface. Similarly, it is possible to heat the surfaces in areas such as inside the air handling unit and provide additional heat in positions where air passes from the heat exchanger towards the evaporator. As the electric heating film is thin it takes virtually no extra space or causes any extra pressure drop. A solution with electric heating film need not affect the basic design of the air handling unit which reduces the cost of the function and increases the function flora of the product range without affecting the production of the air handling unit components. Auxiliary heaters according to current solutions, in a form that does not affect the air handling unit design, usually is mounted as an extra detail in the ductwork on the supply air side, that is, it is a separate component to be handled and installed instead of a possible "plug & play" solution according to invention.

A particularly preferred embodiment of the invention is that the heat exchanger a controllable rotary heat exchanger. The rotary heat exchanger has a high thermal efficiency and rotates at a certain speed when in full operation, for maximum heat recovery from exhaust air and transfer of heat to the supply air. On the exhaust side is also the heat pump evaporator arranged for absorbing heat energy from the air that has passed through the heat exchanger on the way out to the outside air, as previously described. A rotary heat exchanger does not consume a lot of energy during operation. The only energy required is to rotate the rotor wheel at a constant speed. In other words, it does not cost much to let the rotor go for maximum heat recovery, and because of its high temperature efficiency, it is desirable to have high utilization of the rotary heat exchanger when heating is required. The temperature of the exhaust/extract air side, before the evaporator, is of course affected by how much heat energy recovered by the rotary heat exchanger, which is why an extended operation of the heat pump also can be achieved by down-regulation of rotor speed, i.e. reduce the recycling of heat and thereby raising the temperature after the rotor and before the evaporator. Against this speaks, however, the total efficiency, because the operation of the rotor consumes less energy than what the operation of the heat pump, to compensate for the corresponding heat supply, does. Further optimization and collaboration takes place also when the auxiliary heater, and the interaction between these components in relation to various operating conditions, is important, because in some cases, or for short periods, it might be an idea to reduce rotor operation, and in other cases full rotor operation and supplements, etc. It is in other words advantageous to use a controllable rotary heat exchanger in order to optimize the operation at different times of the year and under certain conditions, in cooperation with heat pump operation and the use of the auxiliary heater. By continuously controlling the unit towards as good overall efficiency as possible, a low operating cost is achieved.

As an alternative to use a controllable rotary heat exchanger it is, according to an alternative embodiment, preferred to use a controllable cross flow heat exchanger. This is adjustable in a way that they are sectional, whereby it is possible to open and close valves that regulates the amount of air flow through, and passing the heat exchanger. The same benefits are as above, even if the regulation is somewhat blunter, but in some cases sufficient.

For cases where the additional heat, according to for example requests from a client, must be liquid, the auxiliary heater of that type. The inventive concept is the same, that is, to apply heat in the position, in the flow direction after heat recovery and before the evaporator. Liquid-coupled solutions can be justified if the facility has access to external heat sources other than electricity, such as district heating or the like. The invention is not limited to a special type of external auxiliary heater but its the position that allows extended operation of the heat pump that is most important.

In a preferred embodiment of the invention, the air treatment device comprises a control device, which is arranged to softly control the electric heater, for a substantially continuous adjustment of the heating power. This is preferably done by a so-called TRIAC, which makes it possible to balance the heat output so that the temperature between the heat exchanger and the evaporator is sufficient to keep the heat pump in operation even if the temperature is low. The soft control means that the heating power is adjusted in small steps, providing a virtually continuous power curve for the power output of the heater. At least one of the heating coils/rods/films has this soft control. The most common in older solutions is that the control is done by plugging-in different power steps or combinations thereof, which provides a blunter control.

From a second aspect of the invention the object is achieved to solve the above mentioned problems by at method for heating of air according to the preamble of claim 11, which comprises that additional heat is supplied through an auxiliary heater positioned in the extract air, in the air flow direction after the heat recovery device but before the evaporator, instead as in known solutions add the additional heat in the supply air side. By adding external heat energy to the extract air just before the evaporator the operating time of the heat pump in the system is extended for those cases when the heat pump normally must be shut down, due to low temperature of the incoming air to the evaporator. In the older known solutions must, when the heat pump is turned off, all the heat energy needed to reach optimal supply air temperature, in addition to what is recovered by the heat recovery device, be supplied with an additional heat supply on the supply air side. The difference is that the addition of external heat on the supply air side will yield, at best 1:1 input energy versus the achieved thermal energy, while the heat pump at least gives an exchange of—conservatively estimated—1:3. The regulation of additional heat is optimally adapted to supply a minimum of additional heat to maintain heat pump operation, while retaining the positive performance of the heat pump. Incoming air to the evaporator is kept at the right temperature and the system is balanced and operated to obtain the lowest possible operating cost. The total efficiency of the plant is getting better, especially in cold climates as Nordic. Further the overall efficiency is improved by that it also is possible to allow the heat recovery device continue working at its maximum. In older solutions one is forced to turn off the heat pump for example at an outside temperature of about $-15°$ C., and let the external supply of energy, located in the supply air, provide for the whole need, in addition to the heat that the heat recovery device transfers to the supply air.

According to a preferred embodiment of the method, the supply of external heat energy to the extract air is started, via the auxiliary heater, when the temperature before the evaporator approaches a lower limit value, where normally the heat pump would stop, for example $-15°$ C. By placing a temperature sensor in the extract air after the heat recovery device and before the evaporator, the actual temperature of the air entering the evaporator is measured. While a lower limit value is reached, which preferably is a temperature slightly above the lower operating limit of the heat pump, the heating of the air via the auxiliary heater is started. Naturally, the invention is not limited to that the supply heat only can start at the lower limit, but constantly it is the total efficiency that is interesting, that is, how energy efficient you can run the unit. The optimization of the operation is done by balancing heat pump operation, heat recovery and auxiliary heat.

In a further preferred embodiment of the invented method, the supply of the external heat energy starts, via the auxiliary heater located before the evaporator, when frosting on the evaporator is indicated. Now the indication is done is not defined here, but there are a number of ways of detecting freezing in the evaporator, the important thing is that the indication initiates a defrosting. The evaporator is defrosted during the appropriate time using the addition of external heat energy, or combinations with other defrosting techniques. The applicant has submitted a patent—SE 1200784-5—which describes double sided defrosting of an evaporator in an air handling system with an adjustable heat exchanger and a heat pump, like the installation in the present application. In SE 1200784-5 the double sided defrosting is performed by raising the temperature of the refrigerant within the evaporator in different ways, while the heat exchanger is down regulated, to raise the temperature of the incoming exhaust air to the evaporator, and thus achieve a faster defrost by warming both from inside and outside. With the now present invention it is possible to combine or alternate the, from outside raised temperature of the exhaust air, by either using the auxiliary heater and/or the adjustable heat recovery device to achieve the double sided defrost.

In a preferred embodiment of the invented method, the auxiliary heater is an electric heater and the air treatment device comprises a control device, which softly controls the electric heater, for a substantially continuous adjustment of the heating power. This is preferably done by a so-called TRIAC, which makes it possible to balance the heat output so that the temperature between the heat exchanger and the evaporator is sufficient to keep the heat pump in operation even if the temperature is low. The soft control means that the heating power is adjusted in small steps by 0-10 VDC or communication, which provides a virtually continuous power curve for the power output of the heater. At least one of the heating coils/rods/films has this soft control. The most common in older solutions is that the control is done by plugging-in different power steps or combinations thereof, which provides a blunter control.

According a preferred embodiment of the method, the power output of the electric heater is controlled stepwise, preferably through one or more output steps, and the control device further combines the soft control with the stepwise control for the best possible adaption of power output, such as the temperature between the heat recovery device and the evaporator is balanced and adapted for minimal energy consumption and best total efficiency.

Through the invention a number of advantages compared to known solutions are achieved:
  Extended operating time for the heat pump, which replaces the need for additional heating of the supply air, resulting in a better utilization of the thermal energy from the (at best) 1:1 to the order of 1:3-1:5 when comparing electric heating coil placed in the supply air and an electric heating coil placed before the evaporator.
  Less start/stop for the heat pump, and thus less wear.
  Maintained operation of the heat pump at low temperatures means increased wear now the heat pump is never allowed to be in operation at low temperatures but through a small supply of heat energy before the evaporator the heat pump can operate at favorable conditions.
  A new type of defrosting of the evaporator by the auxiliary heater, which also enables the heat recovery device continuously work with full recovery of heat between exhaust air and supply air, for those cases where it is beneficial from an overall economic operations perspective.
  Smaller dimensions and lower amperage on the main fuse compared to if the corresponding power output would be supplied as electric heat in the supply air, which gives a better total economy.
  In combination with a controllable heat recovery device a high flexibility for the operation is achieved, which enables better control towards good total efficiency.
  Soft control in combination with stepwise control by different power loops in the electric heater gives a flexible and precise control of the power from the auxiliary heater, which adapts the temperature before the evaporator for maintained heat pump operation and optimal total efficiency.

The structural design of the present invention are apparent in the following detailed description of an embodiment of the invention with reference to the accompanying drawings, showing a preferred but not limiting embodiment of the invention.

DETAILED DESCRIPTION OF THE DRAWINGS

Figure 1:
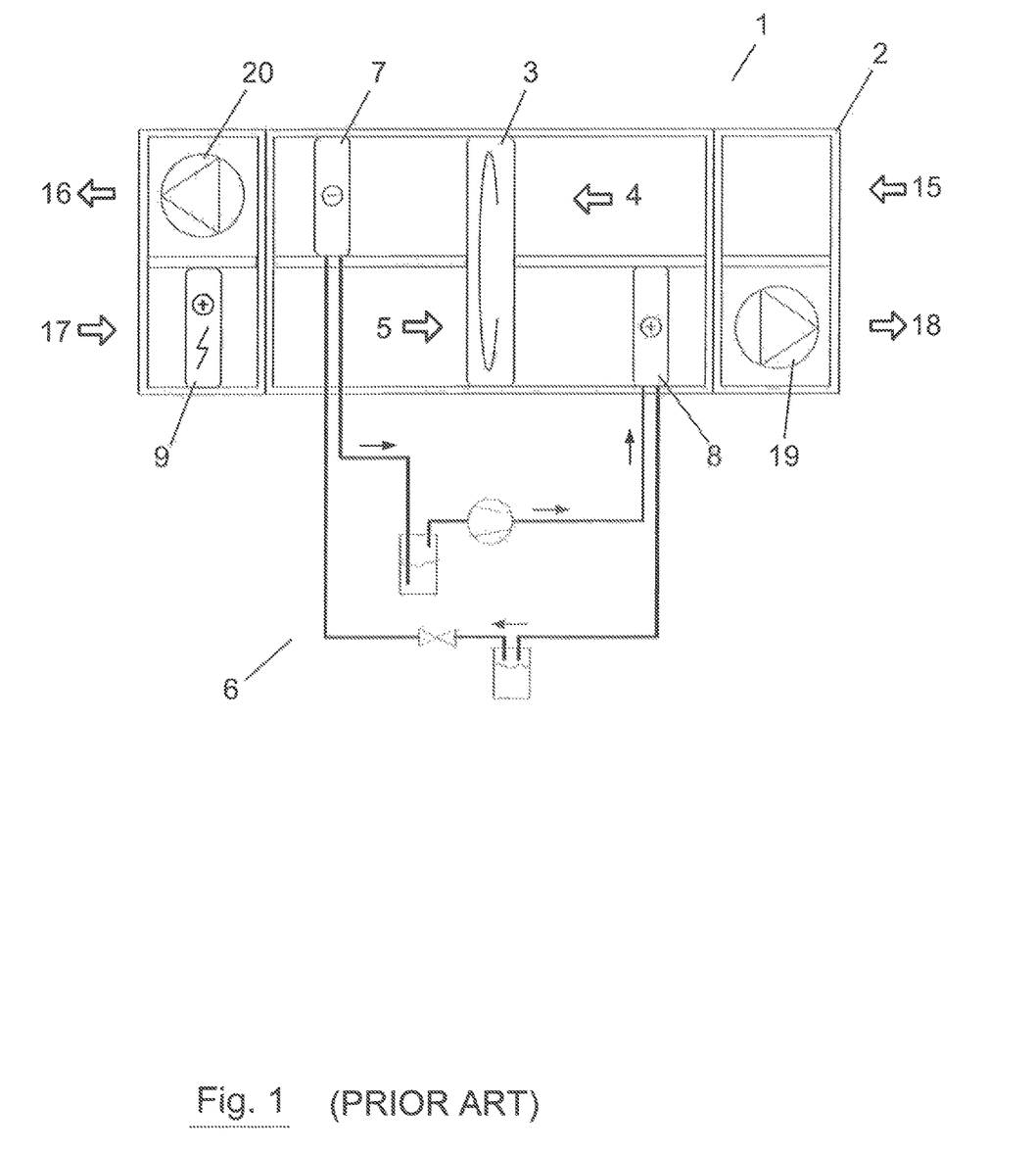
FIG. 1 shows a principal sketch of an air handling unit where the external heat energy is supplied by an auxiliary heater positioned on the supply air side in air flow direction before the heat recovery device.

FIG. 1 shows an overview principal sketch of an air treatment device (1) according to existing technology, which comprises an air handling unit (2), a heat recovery device (3)—here a rotary heat exchanger, a supply air fan (19) and an exhaust air fan (20), a heat pump (6) including a evaporator (7) and a condenser (8). The heat pump (6) can be of various types and is not defined or explained further. The air handling unit (2) comprises a first air stream (4), which in the figure is positioned in the upper half of the air handling unit (2) and directed from right to left. The first air stream (4) comprises, in air flow direction, exhaust air (15), which after the heat recovery device (3) is called extract air (16). Further, the air handling unit (2) comprises a second air stream (5), which in the figure is positioned in the lower half of the air handling unit (2) and in the figure directed from left to right. The second air stream (5) comprises, in air flow direction, outdoor air (17), which after the heat recovery device (3) is called supply sir (18). In the first air stream (4) is the evaporator (7) positioned, i.e. that DX-coil which for the actual operating mode heating, constitutes the evaporator (7). The evaporator (7) is arranged in the air flow direction after the heat recovery device (3) and by the heat pump process heat is retrieved from the extract air (16). In the second air stream (5), in the air flow direction after the heat recovery device (3) is another DX-coil arranged, which for the heating case constitutes the condenser (8) and by the heat pump process the heat is submitted to the supply air by the condenser (8). The heat pump process as such is not discussed further in this application. In the figure is also an auxiliary heater (9) shown, which in the actual case is positioned in the second air stream (5), before the outdoor air (17) reaches the heat recovery device (3). This position occurs mainly in mid and southern Europe and acts as a defroster for the rotary heat exchanger (3)—a so called "frost coil". The supply of heat on the supply air side can be in form of electric heating or water heating. This solution though becomes a pure supply on the supply air side, which does not improve the heat pump operation at low temperatures and is a worse total economic solution than the present invention. The intent is, however, somewhat different.

Figure 2:
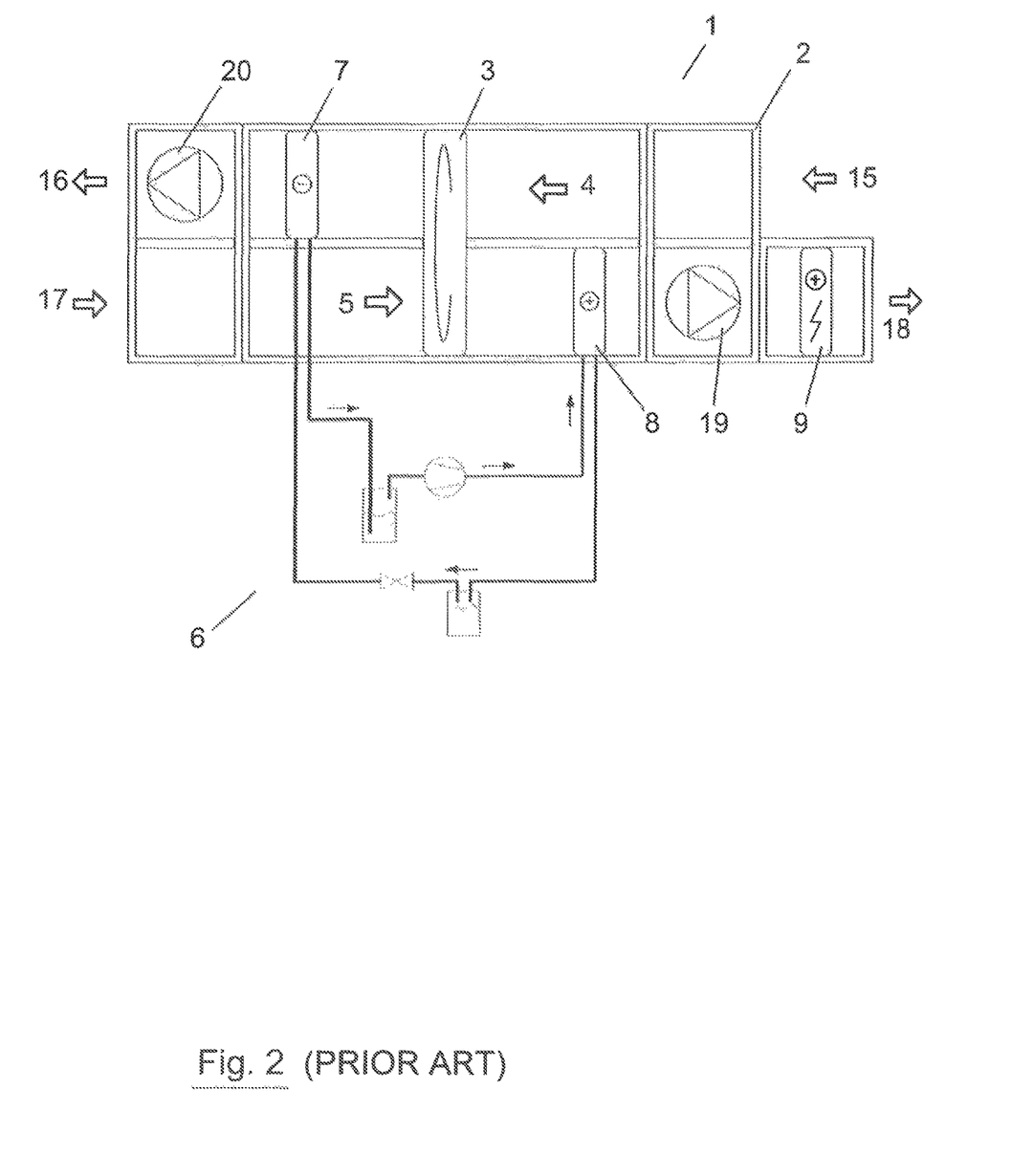
FIG. 2 shows a principal sketch of an air handling unit where the external heat energy is supplied by a auxiliary heater positioned on the supply air side in air flow direction after the heat recovery device.

FIG. 2 shows an overview principal sketch of the air treatment device (1) according existing technique and with included components similar with the above description of FIG. 1. The difference in relation to the solution in FIG. 1 is that the external heat energy is supplied by the auxiliary heater (9) positioned in the supply air (18), in the second air stream (5) and in air flow direction after the rotary heat exchanger (3). This is a very common solution in the Nordic countries for supplying heat energy to maintain the temperature of the supply air (18). This solution has though the above described disadvantages that, at low outdoor temperatures, the heat pump (6) must be shut down and the auxiliary heater must cope with the complete heating demand in addition to what the heat recovery device (3) gives. Thereby the auxiliary heater (9) must, regardless if it is an electric heater or a liquid coupled coil, be dimensioned to cope with these power peaks resulting in that the dimensions of the auxiliary heater (9) becomes big. Further, if the auxiliary heater is electric, the main fuse for the plant might have to be sized up compared to a solution according to the invention. The auxiliary heater (9) can for example be either electric or liquid coupled.

Figure 3:
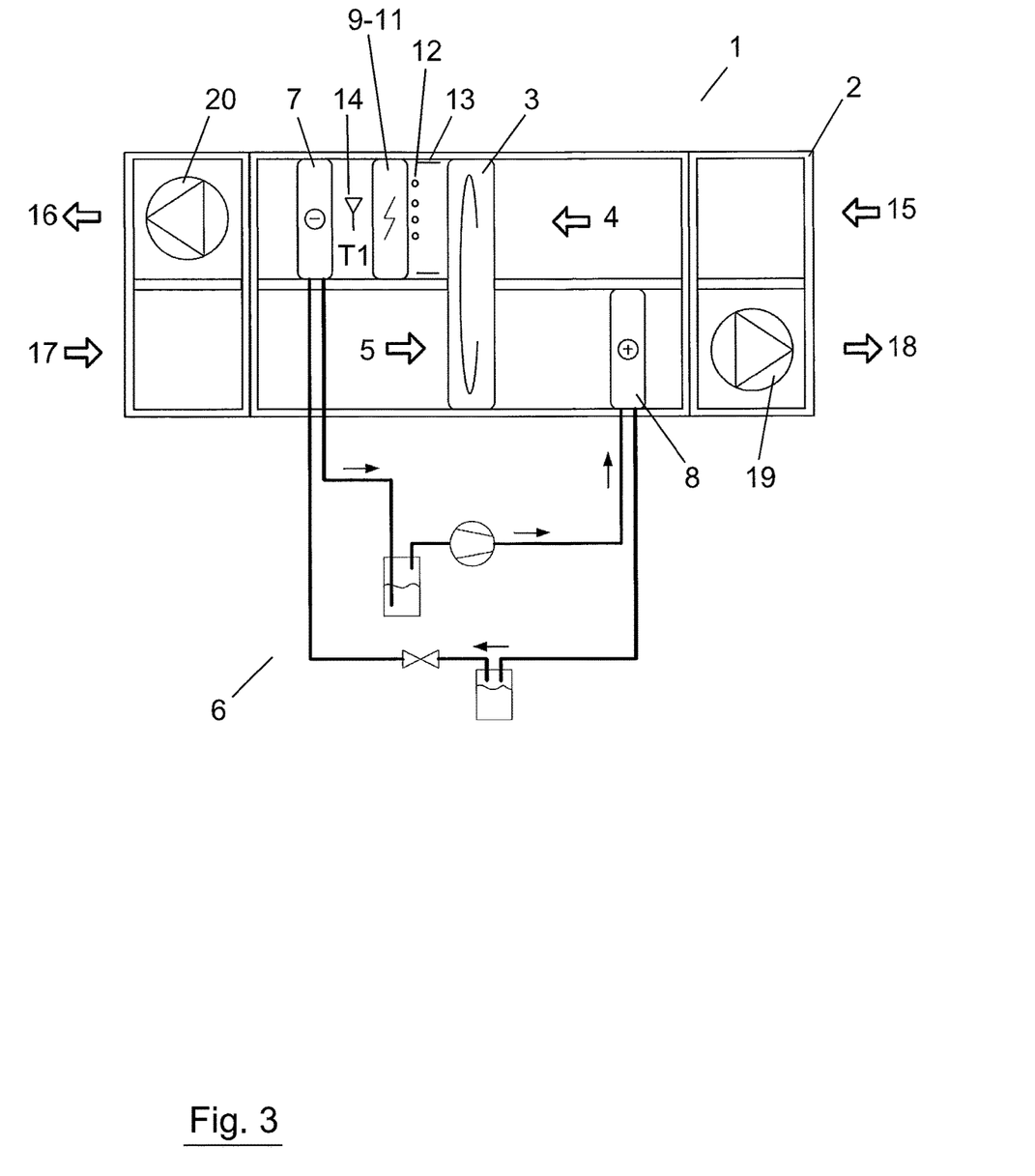
FIG. 3 shows a principal sketch of an air handling unit according to the invention where the external heat energy is supplied by an auxiliary heater positioned on the exhaust air side in air flow direction after the heat recovery device and before the evaporator.

FIG. 3 shows a principal sketch of an air treatment device (1) according to the invention where the external heat energy is supplied by that the auxiliary heater (9) is positioned in the first air stream (4), i.e. on the exhaust air side, and in the air flow direction after the rotary heat exchanger (3) and before the evaporator (7). The auxiliary heater (9) can be of various types according to the scope of the invention, but preferably in the form of an electric heater (10) and particularly a so called electric heating coil (11). Other embodiments presented in the figure are alternative embodiments of the auxiliary heater (9), in the form of one or more electric heating rods (12) alternatively one or more electric heating films (13). Regardless type, the auxiliary heater (9) can be a separate part or integrated with the evaporator (7), though the supply of heat must take place before the evaporator (7). In FIG. 3 there also is a temperature sensor (14) for measuring a temperature T1 before the evaporator (7) and the measurement is used for deciding whether the heat pump (6) shall remain in operation or not and to control if the auxiliary heater (9) shall heat or not. A control device (21), not shown, is used to control the auxiliary heater (9), the operation of the rotary heat exchanger (3), the operation of the heat pump (6) and preferably the remaining operation of the, in the air handling unit (2) included, and controllable components. The auxiliary heater (9) is preferably used as defroster at indicated frost in the evaporator (7). As earlier explained, the positioning means that the heat pump (6) is utilized considerably more than in conventional plants, which contributes to better total economy and smaller dimensions of the heater etc.

Figure 4A:
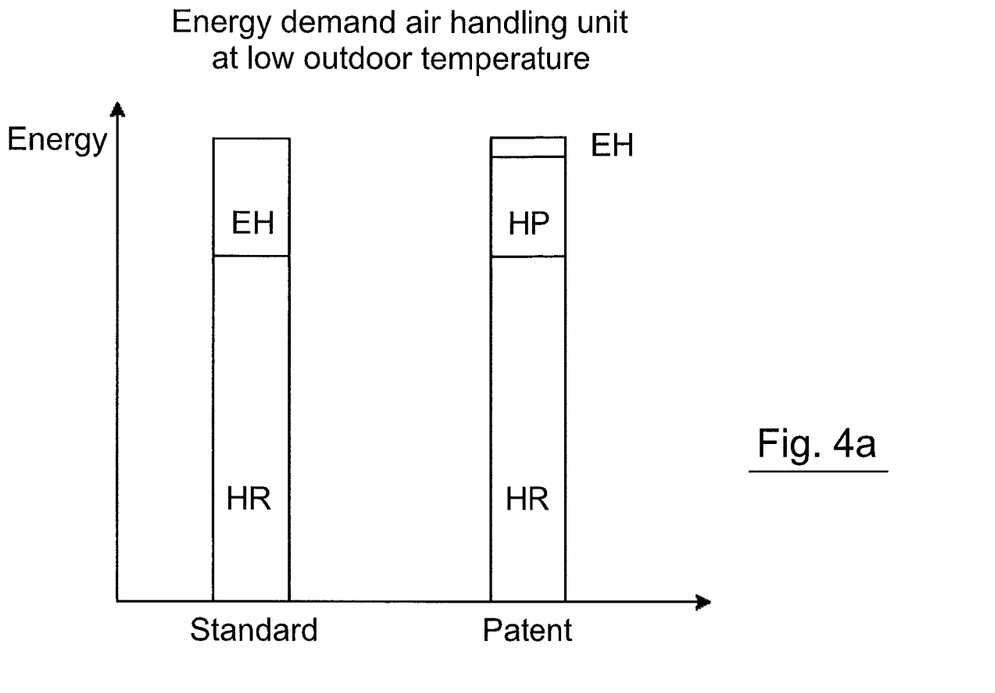
FIGS. 4a and 4b shows schematic bar graphs of energy demand and energy consumption of an air handling unit according to today's technology compared to an air handling unit according to the patent application.
Figure 4B:
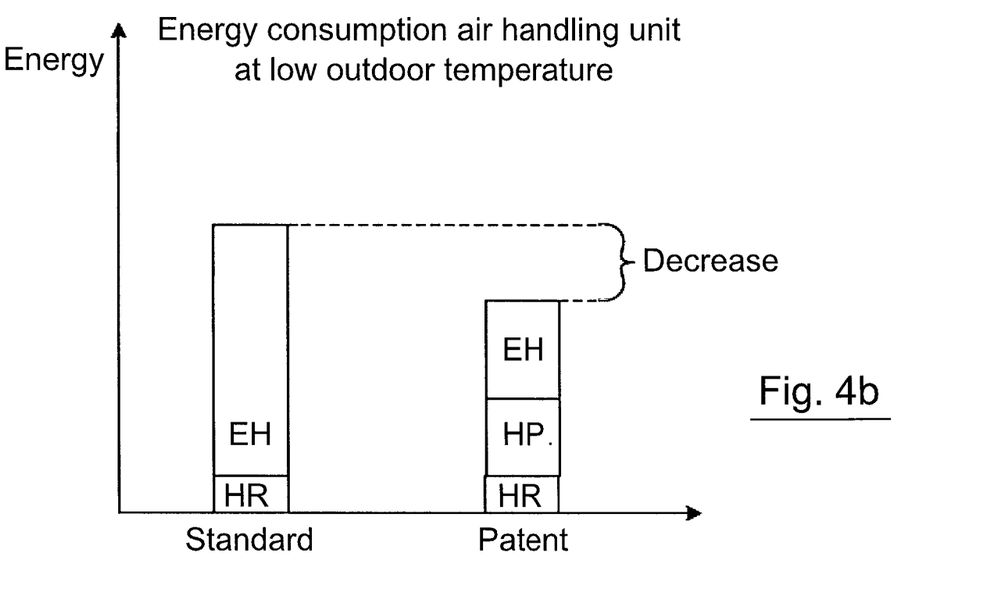

FIGS. 4a and 4b shows schematic bar graphs of energy demand and energy consumption at low outdoor temperature at a standard air handling unit (2) according to today's technology compared to an air handling unit (2) according to the patent application. FIG. 4a shows that it is obviously the same energy demand regardless of the facility involved and that the heat recovery (HR) from the exhaust air (15) and the transfer to the supply air (18), by the heat recovery device (3), contributes largely to cover the energy demand. This entry (HR) varies with type of heat recovery device (3) and can reach around 85% for a rotary heat exchanger. For a standard air handling unit according to today's technique—the left bar the supply of external heat energy (EH) must fill the remaining energy demand in addition to that recovered by the heat recovery device (3). In the right bar—patent—is read that the supply of external heat energy (EH), in this case electric energy, represents a small portion while the heat pump (6) gives the rest of the energy demand (HP) by adding the external heat energy (EH), both as input drive energy to the heat pump (6) and also as extra supply through the auxiliary heater (9) if necessary, to keep the heat pump (6) running at the low outdoor temperature.

FIG. 4b studies schematically the energy consumption of the air handling unit (2) according to current technology compared to techniques according to the patent application. The energy needed to run the rotor wheel (HR) at the rotary heat exchanger (3) is apparently low, why it's motivated to use this as much as possible with high heat recovery. At a plant according to current technique—standard—the heat pump (3) is shut down and the external heat supply (EH) consumes a lot of energy and a high power output from the electric heating coil (11), which then also is larger by dimensions and probably have higher amperage on the main fuse compared to the new way of supplying heat energy. The size of the main fuse varies depending on the size of the air handling unit and variants of electric heating coils. With a solution according to the present invention the supply of external heat energy (EH) is the supply of driving energy for the heat pump together with energy to heat with the auxiliary heater (9), for maintaining heat pump operation. Apparently, the energy consumption decreases and the savings gets greater, the colder it is and the longer the period is where a conventional plant otherwise would let the heat pump be shut off. In addition there are as said the advantages regarding dimensions and main fuse etc.

PARTS LIST

1=aft treatment device
2=air handling unit
3=heat recovery device
4=first air stream
5=second air stream
6=heat pump
7=evaporator
8=condenser
9=auxiliary heater
10=electric heater
11=electric heating d
12=electric heating and
13=electric heating film
14=temperature sensor
15=exhaust air
16=extract air
17=outdoor air
18=supply air
19=supply air fan
20=exhaust air fan
21=control device
EH=external heat energy
HR=heat recovery
HP=heat pump

The invention claimed is:
1. An air treatment device (1) comprising:
an indoor facing side and an outdoor facing side,
an air handling unit (2) having a first duct and a second duct, each of the first duct and the second duct having an inlet and outlet, and the air handling unit having a controllable heat recovery device (3) which, in a heating mode, being arranged to recover heat energy from a first airstream (4) and transfer the recovered heat energy to a second airstream (5), the first duct conducting the first airstream from the inlet of the first duct on the indoor facing side of the air treatment device to the outlet of the first duct on the outdoor facing side of the air treatment device, and the second duct conducting the second airstream conducting-air from the inlet of the second duct on the outdoor facing side of the air treatment device to the outlet of the second duct on the indoor facing side of the air treatment device, the first and the second air ducts continuously preventing air from passing from the first to the second airstream and from the second airstream to the first airstream, said air treatment device (1) further comprises a heat pump (6) which, in the heating mode, being arranged to recover the heat energy from the first airstream (4) and transfer the recovered heat energy to the second airstream (5) to heat the air passing to the indoor facing side of the air treatment device via the outlet of the second duct, and the heat pump (6) comprises a condenser (8) and an evaporator (7), the evaporator being arranged in the first airstream (4), in a flow direction of the first airstream, downstream of the heat recovery device (3), and the condenser (8) being arranged in the second airstream (5), in a flow direction of the second airstream, downstream of the heat recovery device (3), the air treatment device (1) further comprising an auxiliary heater (9) for supplying the first airstream with external heat energy in addition to the recovered heat energy, wherein the auxiliary heater (9) is an electric heater (10) and only communicates with the air passing through the first duct from the indoor facing side of the air treatment device, and the auxiliary heater is positioned in the first airstream (4) within the first duct, in the flow direction of the first airstream, downstream of the heat recovery device (3) and upstream of the evaporator (7), and the air treatment device (1) further comprises a control device (21), which is configured to control heating power of the electric heater (10), the recovery of heat energy by the heat recovery device, and operation of the heat pump, and in the heating mode, the heating power of the electric heater being either increased or decreased by the control device along a substantially continuous power curve such that a certain temperature (T1) of the first airstream between the heat recovery device (3) and the evaporator (7) is maintained.

2. The air treatment device according to claim 1, wherein the auxiliary heater (9) is arranged integrated with the evaporator (7) on a side of the evaporator in the first airstream facing the heat recovery device (3).

3. The air treatment device according to claim 1, wherein the auxiliary heater (9) comprises at least one electric heating coil (11).

4. The air treatment device according to claim 1, wherein the auxiliary heater (9) comprises at least one electric heating rod (12).

5. The air treatment device according to claim 1, wherein the auxiliary heater (9) comprises at least one electric heating film (13).

6. The air treatment device according to claim 1, wherein the heat recovery device (3) is a controllable rotary heat exchanger (3).

7. The air treatment device according to claim 1, wherein the heat recovery device (3) is a controllable cross flow heat exchanger (15) having sections that open and close to regulate an amount of airflow through and past the cross flow heat exchanger.

8. A method for heating of air in an heating mode of an air treatment device (1), said air treatment device (1) comprises an indoor facing side and an outdoor facing side, an air handling unit (2) having first and second ducts and a controllable heat recovery device (3), for recovering heat energy from a first airstream (4) and transferring the recovered heat energy to a second airstream (5), the first duct conducting the first airstream from the indoor facing side to the outdoor facing side of the air treatment device, and the second duct conducting the second airstream from the outdoor facing side to the indoor facing side of the air treatment device, said air treatment device (1) further comprises a heat pump (6), for recovering heat energy from the first airstream (4) and transferring the recovered heat energy to the second airstream (5), said heat pump (6) comprises an evaporator (7) arranged in the first airstream (4), in a flow direction of the first airstream, downstream of the heat recovery device (3), and a condenser (8) arranged in the second airstream (5), in a flow direction of the second airstream, downstream of the heat recovery device (3), the air treatment device (1) further comprises an auxiliary heater (9) which is positioned to only communicate with air passing through the first duct from the indoor facing side of the air treatment device for supplying the first airstream with external heat energy, in addition to the recovered heat energy, the method comprising:

locating the auxiliary heater (9) in the first airstream (4), in the flow direction of the first airstream, downstream of the heat recovery device (3) and upstream of the evaporator (7) for supplying the external heat energy only to the air passing from the indoor facing side to the outdoor facing side of the air treatment device;

using an electric heater (10) as the auxiliary heater (9);

using a control device (21) as the air treatment device (1) for controlling the electric heater (10),     operating the air treatment device in the heating mode to increase a temperature of the air of the second airstream conducted from the outdoor facing side to the indoor facing side of the air treatment device and     either increasing or decreasing heating power of the electric heater with the control device along a substantially continuous power curve for maintaining a certain temperature (T1) of the first airstream between the heat recovery device (3) and the evaporator (7).

9. The method according to claim 8, further comprising stepwise controlling, via the control device (21), the heating power of the electric heater (10), and the control device (21) adjusting the heating power of the electric heater in steps of 0-10 VDC, for maintaining the certain temperature (T1) of the first airstream between the heat recovery device (3) and the evaporator (7).

10. The air treatment device according to claim 1, wherein the first and the second air ducts continuously preventing air from passing between the inlet of the first duct and the outlet of the second duct, and air from passing between the inlet of the second duct and the outlet of the first duct.

\* \* \* \* \*